United States Patent
Mizuno (10) Patent No.: US 7,477,679 B2
(45) Date of Patent: Jan. 13, 2009

(54) SPREAD SPECTRUM DEMODULATOR EMPLOYING FREQUENCY DETECTION

(75) Inventor: Koutaro Mizuno, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 764 days.

(21) Appl. No.: 10/983,645

(22) Filed: Nov. 9, 2004

(65) Prior Publication Data

US 2005/0157777 A1 Jul. 21, 2005

(30) Foreign Application Priority Data

Dec. 26, 2003 (JP) ............................. 2003-433052

(51) Int. Cl.
  H04B 1/05 (2006.01)
  H04B 1/22 (2006.01)
  H04L 27/06 (2006.01)
  H04L 27/10 (2006.01)
  H04L 27/148 (2006.01)
  H03D 1/04 (2006.01)

(52) U.S. Cl. ................... 375/150; 375/147; 375/324; 375/334; 375/343; 375/346

(58) Field of Classification Search .............. 375/150
See application file for complete search history.

(56) References Cited

U.S. PATENT DOCUMENTS

| | | | | |
|---|---|---|---|---|
| 3,613,313 A * | 10/1971 | Lowry | ............... | 49/420 |
| 4,897,857 A * | 1/1990 | Wakatsuki et al. | ........... | 375/317 |
| 5,210,770 A * | 5/1993 | Rice | ............... | 375/142 |
| 5,684,837 A * | 11/1997 | Chen | ............... | 375/334 |
| 6,094,449 A * | 7/2000 | Komatsu | ............... | 375/136 |
| 6,363,106 B1 * | 3/2002 | Popovic et al. | ............... | 375/150 |
| 6,373,881 B1 * | 4/2002 | Mizuguchi et al. | ............... | 375/147 |
| 2001/0030992 A1 * | 10/2001 | Kim et al. | ............... | 375/148 |
| 2005/0089113 A1 * | 4/2005 | Seidl | ............... | 375/271 |

FOREIGN PATENT DOCUMENTS

DK 0470505 A2 * 7/1992

OTHER PUBLICATIONS

Stular, Mitja et. al., "Mean Periodic Correlation of Sequences in CDMA", vol. 1, Aug. 19-22, 2001 pp. 287-290 vol. 1 Digital Object Identifier 10.1109/Tencon.2001.949598, Proceedings of IEEE Conference on Electrical and Electronic Technology.*

(Continued)

Primary Examiner—Mohammad H Ghayour
Assistant Examiner—Sarah Hassan
(74) Attorney, Agent, or Firm—Studebaker & Brackett PC; Donald R. Studebaker (57) ABSTRACT

A simplified spread spectrum demodulator uses a frequency detector to demodulate a modulated spread spectrum signal to obtain successive chip values. A correlation unit correlates the successive chip values with fixed sequences of correlation coefficients to generate correlation values. A decision circuit selects one of the correlation values to decide what symbol the spread spectrum signal represents. The correlation coefficients are obtained by applying the same modulation method as used to modulate the spread spectrum signal, and then the same demodulation method as used by the frequency detector, to the sequences of chips representing different symbols. Since synchronous detection is not employed, no carrier recovery circuit is needed.

25 Claims, 7 Drawing Sheets

OTHER PUBLICATIONS

Miller, S.L. IEEE Transactions on Communications, vol. 42, Issue 234, Part 2, Feb.-Apr. 1994 pp. 829-833, Digital Object Identifier 10.1109/TCOMM.1994.580183.*

A new software demodulation method of MSK signal based on phase information Shang, J.; Systems and Control in Aerospace and Astronautics, 2006. ISSCAA 2006. 1st International Symposium on Jan. 19-21, 2006 pp. 3 pp.*

Comprehensive features based digital modulation identification using a neural tree network Yue-xian Wu; Lin-dong Ge; Fan-fan Liu; Communications, Circuits and Systems, 2005. Proceedings. 2005 International Conference on vol. 2, May 27-30, 2005 Page(s).*

H. Nawata, et al., "Burst Demodulator for Offset QPSK", IEICE, SB-3-5, 1988, pp. 1-564.

M. Yoichi, et al., "A Digital Burst Demodulator for OQPSK—A Reverse Modulation Type Carrier Recovery Circuit and an Interpolation Type Clock Recovery Circuit—", IEICE, B-200, 1992, p. 2-200.

M. Yoichi, et al., "A Study on Digital Carrier Recovery Circuit for OQPSK—Reverse Modulation Tank Limitter Method—", IEICE, B-150, 1991, p. 2-150.

M. Yoichi, et al., "A Full Digital Burst Demodulator for OQPSK Signals", IEICE, SAT92-2, 1992, pp. 3-8.

* cited by examiner

FIG.1

| DATA SYMBOL (DECIMAL) | DATA SYMBOL (BINARY) $(b_0\ b_1\ b_2\ b_3)$ | CHIP VALUES $(c_0\ c_1\ \cdots\cdots\ c_{30}\ c_{31})$ |
|---|---|---|
| 0 | 0000 | 11011001110000110101001000101110 |
| 1 | 1000 | 11101101100111000011010100100010 |
| 2 | 0100 | 00101110110110011100001101010010 |
| 3 | 1100 | 00100010111011011001110000110101 |
| 4 | 0010 | 01010010001011101101100111000011 |
| 5 | 1010 | 00110101001000101110110110011100 |
| 6 | 0110 | 11000011010100100010111011011001 |
| 7 | 1110 | 10011100001101010010001011101101 |
| 8 | 0001 | 10001100100101100000011101111011 |
| 9 | 1001 | 10111000110010010110000001110111 |
| 10 | 0101 | 01111011100011001001011000000111 |
| 11 | 1101 | 01110111101110001100100101100000 |
| 12 | 0011 | 00000111011110111000110010010110 |
| 13 | 1011 | 01100000111011110111000110010001 |
| 14 | 0111 | 10010110000011101111011100011001 |
| 15 | 1111 | 11001001011000000111011110111000 |

FIG.2

$$p(t) = \begin{cases} \sin(\pi \cdot t/2Tc) & \cdots\cdots 0 \leq t \leq 2Tc \\ 0 & \cdots\cdots \text{otherwise} \end{cases}$$

| DATA SYMBOL (DECIMAL) | DATA SYMBOL (BINARY) ($b_0\ b_1\ b_2\ b_3$) | CHIP VALUES (FSK DEMOD) ($c'_0\ c'_1$ ......... $c'_{30}\ c'_{31}$) |
|---|---|---|
| 0 | 0000 | 11000000111011110101110011011 00x |
| 1 | 1000 | 10011100000011101111010111001 10x |
| 2 | 0100 | 11011001110000001110111101011 10x |
| 3 | 1100 | 11001101100111000000111011110 10x |
| 4 | 0010 | 01011100110110011100000011101 11x |
| 5 | 1010 | 11110101110011011001110000001 11x |
| 6 | 0110 | 11101111010111001101100111000 00x |
| 7 | 1110 | 00001110111101011100110110011 10x |
| 8 | 0001 | 00111111000100001010001100100 11x |
| 9 | 1001 | 01100011111100010000101000110 01x |
| 10 | 0101 | 00100110001111110001000010100 01x |
| 11 | 1101 | 00110010011000111111000100001 01x |
| 12 | 0011 | 10100011001001100011111100010 00x |
| 13 | 1011 | 00001010001100100110001111110 00x |
| 14 | 0111 | 00010000101000110010011000111 11x |
| 15 | 1111 | 11110001000010100011001001100 01x |

SPREAD SPECTRUM DEMODULATOR EMPLOYING FREQUENCY DETECTION

BACKGROUND OF THE INVENTION

1. Field of the Invention

The present invention relates to a demodulator suitable for use in, for example, a direct-sequence spread spectrum communication system employing offset quadrature phase-shift keying (OQPSK) modulation.

2. Description of the Related Art

Conventional OQPSK demodulators have been described in various publications of the Institute of Electronics, Information and Communication Engineers (IEICE) of Japan, including IEICE SB-3-5 (1988, p. 1-564), IEICE B-150 (1991, p. 2-150), IEICE B-200 (1992, p. 2-200), and IEICE SAT 92-2 (1992, pp. 3-8). These demodulators generally employ synchronous detectors that compare the phase of the received OQPSK modulated signal with the phase of a synchronized reference carrier signal. Various synchronous detection methods are employed, but all require at least a carrier recovery circuit to generate the reference carrier signal from the received OQPSK signal, a clock recovery circuit, a bandpass filter (BPF), and a low-pass filter (LPF). These circuits take up considerable space, especially the carrier recovery circuit, which typically includes a phase-locked loop or a reverse modulator.

An OQPSK demodulator employing synchronous detection is unavoidably large and complex. There is a need for a smaller and simpler type of OQPSK demodulator.

SUMMARY OF THE INVENTION

An object of the present invention is to provide a simplified demodulator for a spread-spectrum signal.

The invented demodulator receives a spread spectrum signal, modulated by a predetermined modulation method, in which different data symbols are represented by predetermined sequences of chips. A frequency detector detects the received signal to generate a frequency-detected signal representing successive chip values. A correlation unit correlates the frequency-detected signal with predetermined sequences of correlation coefficients to generate a plurality of correlation values. A decision circuit selects one of the correlation values, thereby deciding which one of the data symbols the spread spectrum signal represents.

The predetermined sequences of correlation coefficients are obtained by modulating the predetermined sequences of chips representing the symbol values by the same modulation method as used to modulate the spread spectrum signal, and demodulating the resulting modulated sequences of chips by the same detection method as used by the frequency detector. The modulation method may be a phase modulation method such as OQPSK. The frequency detection method may be a method of the type employed in frequency-shift keying demodulation.

This type of frequency detection is inherently simpler than synchronous detection. In particular, the invented demodulator does not require a carrier recovery circuit.

DETAILED DESCRIPTION OF THE INVENTION

Embodiments of the invention will now be described with reference to the attached drawings, in which like elements are indicated by like reference characters. The embodiments assume a direct-sequence spread spectrum communication system satisfying the following conditions (a) to (d).

(a) OQPSK modulation is used.

(b) Sixteen data symbols are coded as pseudo-random sequences of chip values with low mutual correlation (the sequences are substantially orthogonal).

(c) Each pseudo-random sequence includes thirty-two (32) chips.

Figure 1:
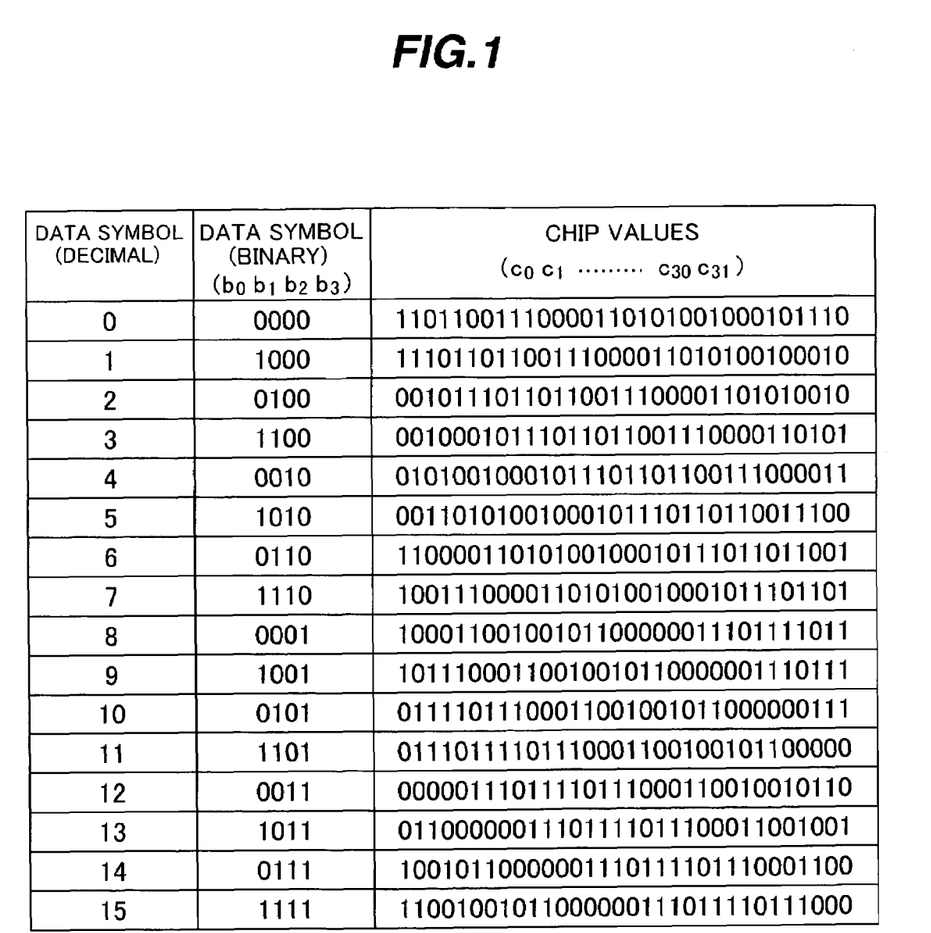
FIG. 1 is a table of chip sequences representing symbol values.

FIG. 1 shows a specific set of pseudo-random sequences that may be used. The sequences of chip values representing data symbols '0' to '7' are produced by successive four-chip shifts of a single pseudo-random noise (PN) sequence. Each sequence of chip values can be divided into an even-numbered subsequence ($c_0, c_2, c_4, \ldots, c_{30}$) and an odd-numbered subsequence ($c_1, c_3, c_5, \ldots, c_{31}$). Data symbols '8' to '15' have the same even-numbered chip values as data symbols '0' to '7'. The odd-numbered chip values of data symbols '8' to '15' are complementary to the odd-numbered chip values of data symbols '0' to '7'.

Figure 2:
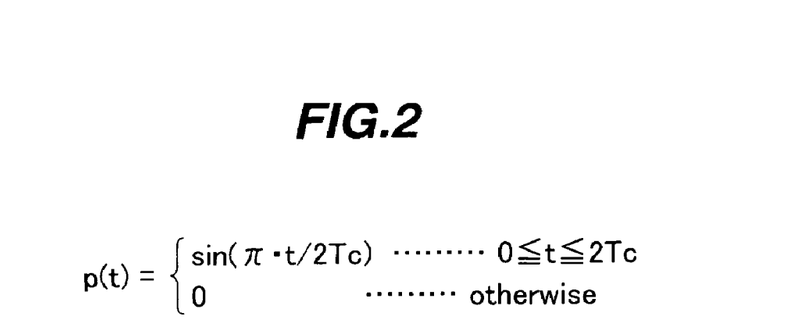
FIG. 2 shows a mathematical expression defining a pulse shape.

(d) The pulse shape is defined as in FIG. 2.

Figure 3:
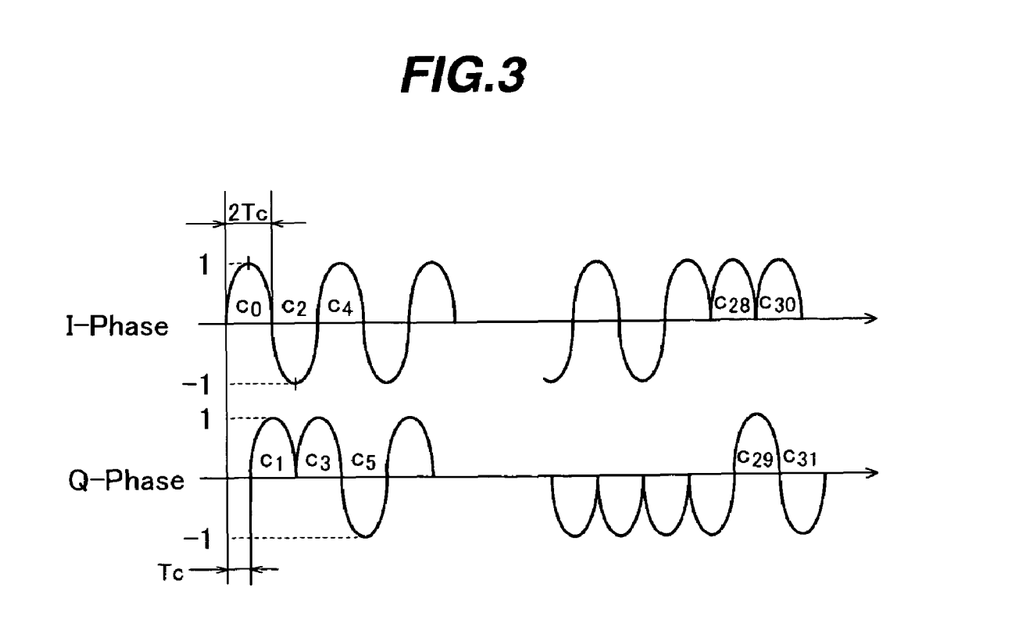
FIG. 3 shows a pair of pulse sequences representing a symbol in direct-sequence spread spectrum communication.

FIG. 2 defines a sinewave shape over the chip period (2Tc). FIG. 3 shows examples of pseudo-random sequences of pulses of this shape, joined on the time axis.

The two sequences in FIG. 3 are transmitted on mutually orthogonal carrier channels, referred to as an in-phase (I-phase) channel and a quadrature-phase (Q-phase) channel. Since OQPSK modulation is used, the Q-phase pulses are offset (delayed) by one half chip period (Tc) from the I-phase pulses. The chip values ($c_0$ to $c_{31}$) are assigned alternately as I-phase data and Q-phase data. The waveforms in FIG. 3 correspond to data symbol '0' in FIG. 1: $c_0=1$, $c_1=1$, $c_2=0$, $c_3=1$, $c_4=1$, $c_5=0$, .... The '0' chip values in FIG. 1 become inverted pulses (peaking at −1) in FIG. 3.

In the direct-sequence spread spectrum communication system assumed in the following embodiments, 4-bit data symbols are spread into 32-chip sequences for transmission to the receiver. In ordinary direct-sequence spread spectrum communication, the receiver uses the same 32-chip sequences are used to despread the received signal and recover the data symbols, but in the embodiments described below, different chip sequences are used for despreading.

First Embodiment

Figure 4:
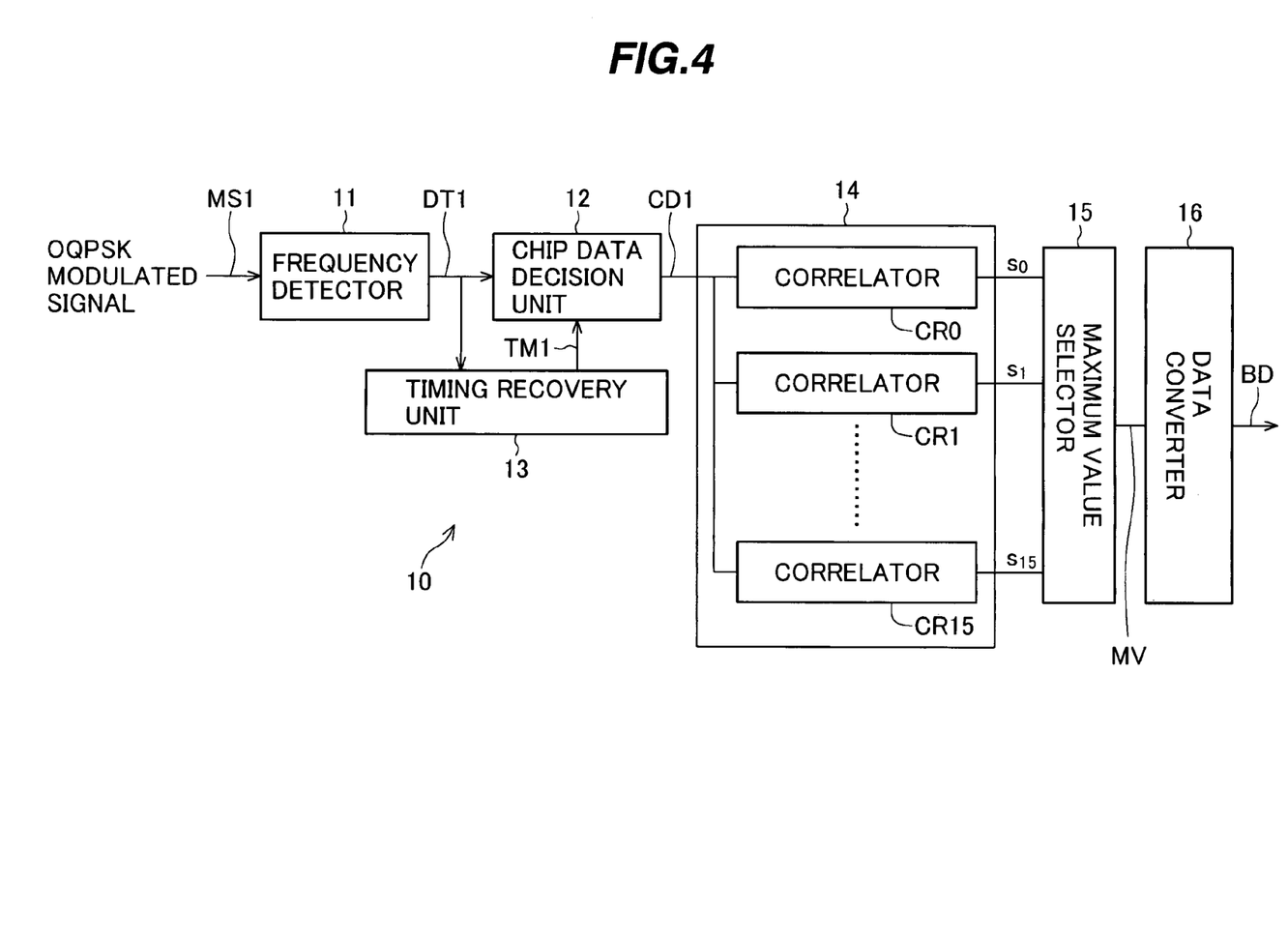
FIG. 4 is a block diagram of a demodulator illustrating a first embodiment of the invention.

Referring to FIG. 4, the first embodiment is a demodulator 10 comprising a frequency detector 11, a chip data decision unit 12, a timing recovery unit 13, a correlation unit 14, a maximum value selector 15, and a data converter 16.

The frequency detector 11 receives a modulated signal MS1, performs frequency detection, and outputs a frequency-detected signal DT1. The type of frequency detection performed is also known as frequency-shift keying (FSK) demodulation, and the detected signal DT1 will also referred to below as FSK demodulated data. Although the size of the frequency detector (FSK demodulator) 11 depends on the specific frequency detection method employed, the frequency detector 11 can be realized in a much smaller circuit than a conventional synchronous detector.

The modulated signal MS1 is a direct-sequence spread spectrum communication signal modulated according to conditions (a) to (d) above. If the modulated signal MS1 has the upper waveform shown in FIG. 5, for example, the frequency-detected signal DT1 obtained by the frequency detector 11 as a result of frequency detection has the lower waveform in FIG. 5.

The timing recovery unit 13 in FIG. 4 estimates the optimal decision timing TM1 for the chip data on the basis of the frequency-detected signal DT1, and notifies the chip data decision unit 12 of this timing.

Operating at this optimal timing TM1, the chip data decision unit 12 decides whether the value of each chip in the frequency-detected signal DT1 represents '1' or '0' data, and outputs a chip data sequence CD1.

Figure 5:
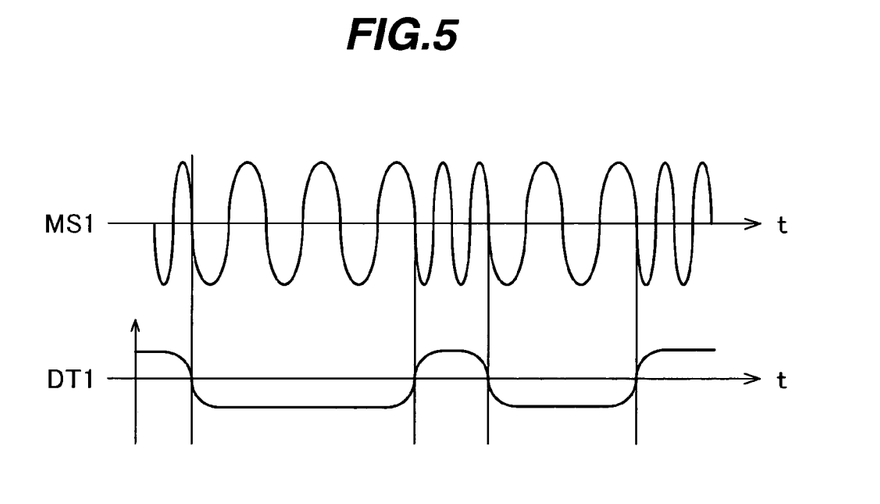
FIG. 5 shows waveforms illustrating frequency-shift keying detection of an OQPSK modulated signal.
Figure 6:
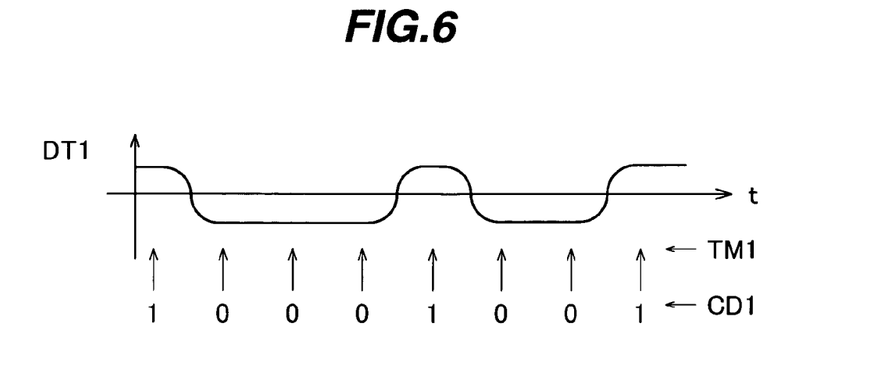
FIG. 6 illustrates the decision timing for the waveforms in FIG. 5, and the corresponding chip data values.

Given the frequency-detected signal DT1 shown in FIG. 5, the optimal timing TM1 estimated by the timing recovery unit 13 and the chip data values output by the chip data decision unit 12 are as shown in FIG. 6. The chip data sequence CD1 in the example in FIG. 6 is '10001001 . . . '.

The correlation unit 14 includes a separate correlator for each of the sixteen data symbols. The chip data sequence CD1 output from the chip data decision unit 12 is supplied simultaneously to the plurality of correlators CR0 to CR15 in the correlation unit 14. The chip data sequence CD1 is correlated with data symbol '0' by correlator CR0, with data symbol '1' by correlator CR1, with data symbol '2' by correlator CR2, with data symbol '3' by correlator CR3, . . . , and with data symbol '15' by correlator CR15.

The correlators CR0 to CR15 execute despreading correlation calculations using different correlation coefficients, and output correlation values $s_0$ to $s_{15}$ as a result of the calculations. The correlation coefficients used by each correlator are a data pattern obtained by OQPSK modulation of the 32-chip sequence of the corresponding data symbol, followed by FSK demodulation of the OQPSK-modulated result.

For example, the 32-chip sequence of data symbol '0' in FIG. 1 is '11011001110000110101001000101110' (=$c_0$, $c_1$, $c_2$, $c_3$, . . . , $c_{31}$). As shown in FIG. 3, the even numbered chip values $c_0$, $c_2$, $c_4$, . . . , $c_{30}$ belong to the I-phase, and the odd numbered chip values $c_1$, $c_3$, $c_5$, . . . , $c_{31}$ belong to the Q-phase. To obtain the corresponding correlation coefficients, first the 32 chip values are converted to pulses with waveforms satisfying condition (d), and OQPSK modulation is performed.

Figure 7:
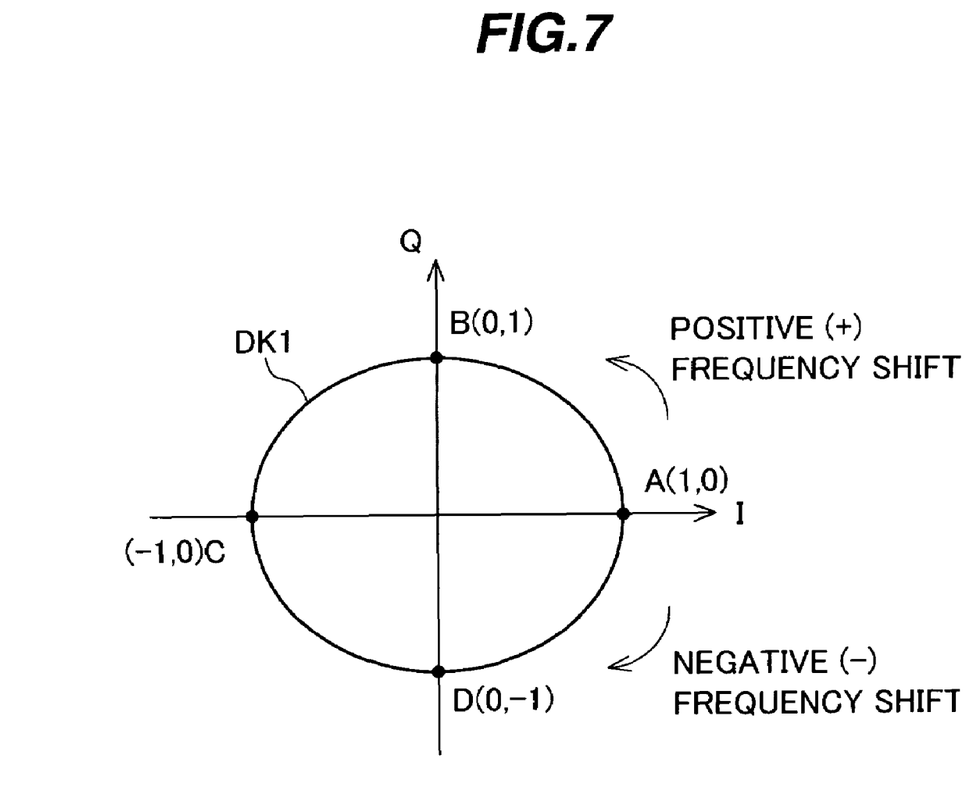
FIG. 7 illustrates frequency shifts in the phase plane.

The combined phase of the modulated signal shifts among points A, B, C, and D in the phase plane shown in FIG. 7. The (I, Q) coordinates of point A are (1, 0). Correspondingly, in FIG. 3, when the I-phase signal is at the '1' amplitude level, the Q-phase signal is always at the '0' amplitude level. Similarly, when the Q-phase signal in FIG. 3 is at the '1' amplitude level, the I-phase signal is always at the 0 amplitude level, and the coordinates of point B in FIG. 7 are (0, 1); when the I-phase signal in FIG. 3 is at the −1 amplitude level, the Q-phase signal is always at the 0 amplitude level, and the coordinates of point C in FIG. 7 are (−1, 0); when the Q-phase signal in FIG. 3 is at the −1 amplitude level, the I-phase signal is always at the 0 amplitude level, and the coordinates of point D in FIG. 7 are (0, −1).

The first chip $c_0$ in the 32-chip sequence for data symbol '0' belongs to the I-phase in FIG. 3 and its value is '1', so it corresponds to point A in FIG. 7. Similarly, the second chip $c_1$ belongs to the Q-phase and its value is '1' in FIG. 3, so it corresponds to point B in FIG. 7. The third chip $c_3$ belongs to the I-phase and its value is '−1' in FIG. 3, so it corresponds to point C in FIG. 7. The fourth chip $c_4$ belongs to the Q-phase and its value is '1' in FIG. 3, so it corresponds to point B in FIG. 7. The thirty-second chip $c_{32}$ belongs to the Q-phase and its value is '−1' in FIG. 3, so it corresponds to point D in FIG. 7.

All thirty-two chips representing data symbol '0' are shaped into pulses according to condition (d) and OQPSK modulation is performed. The phase of the modulated signal shifts among points A to D in the phase plane in FIG. 7 as follows: A-B-C-B-A-D-C-B-A-B-C-D-C-D-A-B-C-B-C-B-C-D-A-D-C-D-A-D-A-B-A-D. Converted to positive (+) and negative (−) frequency shifts by FSK detection, this sequence becomes '++−−−−−−+++−++++−+−+++−−++−++−−'. If a positive (+) frequency shift represents a chip value of '1' and a negative (−) frequency shift represents '0', then this sequence of frequency shifts yields a 32-chip sequence '11000000111011110101110011011100x' of frequency-detected signal values (FSK demodulated data) in which the final value (x) is indeterminate. The thirty-one determinate chip values are used as the correlation coefficients for data symbol '0'.

As this example shows, after OQPSK modulation and FSK demodulation, the thirty-two chip values of a data symbol in FIG. 1 produce only thirty-one correlation coefficients, the thirty-second value being indeterminate. The reason is that in FSK demodulation, the value of the last chip (the thirty-second chip) varies depending on the next data symbol, more precisely on the value of the first chip in the next data symbol.

Figure 8:
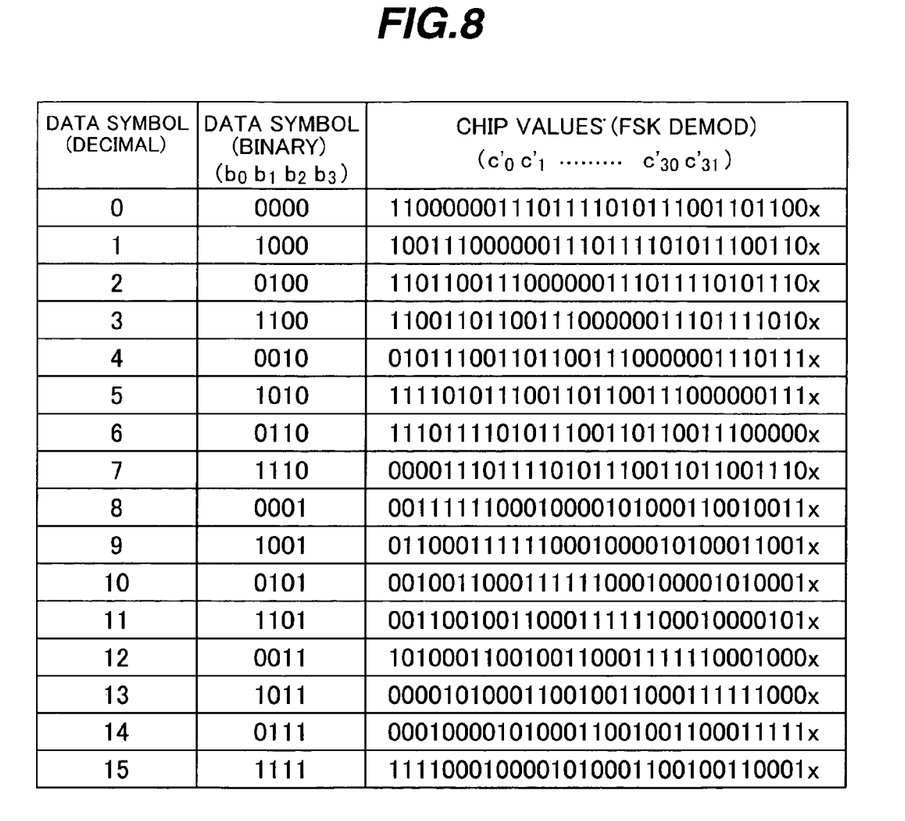
FIG. 8 is a table of correlation coefficients used by the correlators in FIG. 4.

Correlation coefficients for the other fifteen data symbols ('1' to '15') are obtained in the same way. The resulting coefficient sequences are shown in FIG. 8.

The correlators CR0 to CR15 calculate the correlation values $s_0$ to $s_{15}$ by correlating the chip data CD1 with these correlation coefficients. Because there are only thirty-one correlation coefficients for each data symbol, the minimum correlation value is 0 (all chips mismatch) and the maximum correlation value is 31 (all chips match).

Figure 9:
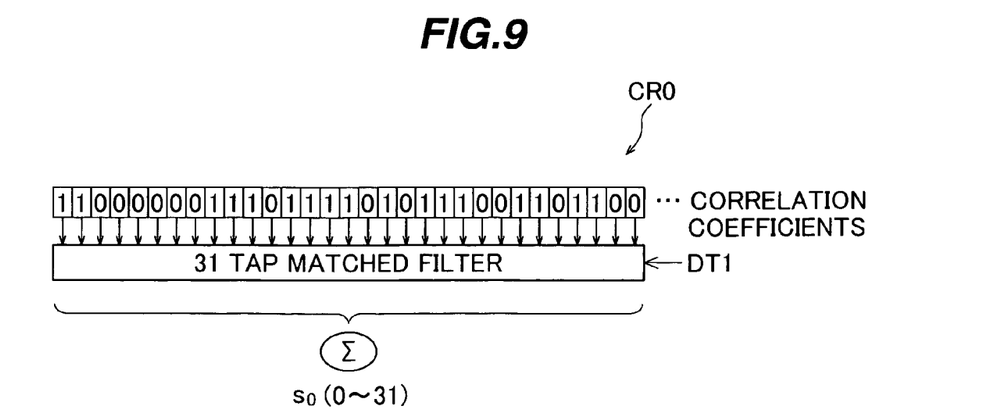
FIG. 9 illustrates the conceptual structure of a correlator.

Aside from using different correlation coefficients, all sixteen correlators CR0 to CR15 have the same internal structure. If matched-filter correlators are used, for example, each correlator may have the structure shown conceptually in FIG. 9. The 31-tap matched filter takes the chip-wise exclusive-NOR or the correlation coefficients and the detected data DT1 and the results are summed to produce the correlation value.

Referring again to FIG. 4, the maximum value selector 15 compares the correlation values $s_0$ to $s_{15}$ output from the sixteen correlators CR0 to CR15, decides which correlator has produced the largest correlation value, and outputs a maximum value signal MV indicating this correlator. For example, if the correlation value $s_1$ produced by correlator CR1 is larger than any of the other correlation values, the maximum value signal MV indicates that the received modulated signal MS1 represents data symbol '1'.

The data converter 16 outputs binary data BD corresponding to the maximum value signal MV. For example, if the maximum value signal MV indicates data symbol '1', the data converter 16 outputs the binary data '1000' ($b_0b_1b_2b_3$) shown in FIG. 8.

Next, the operation of the first embodiment will be described.

In this embodiment, a transmitter (not shown) performs the type of direct-sequence spread spectrum modulation defined by conditions (a) to (d) and transmits the resulting modulated signal MS1, which has a waveform such as the one shown in FIG. 5, for example. The transmitter may use any modulation method that converts a data symbol such as '0' (decimal) or '0000' (binary) to a 32-chip sequence (such as the sequence '11011001110000110101001000101110' given in FIG. 1, for example).

The demodulator 10 is disposed in a receiver that receives the modulated signal MS1 via a transmission channel. The frequency detector 11 performs frequency detection (FSK demodulation), and then outputs a frequency-detected signal DT1 as shown in FIG. 5. This frequency-detected signal DT1 is sent to the chip data decision unit 12 and timing recovery unit 13.

The timing recovery unit 13 determines the optimal decision timing TM1 for the chip data on the basis of this frequency-detected signal DT1, and the chip data decision unit 12 operates at this optimal timing TM1 to decide whether the value of each chip in the frequency-detected signal DT1 represents '1' or '0' as shown in FIG. 6, and supplies the resulting chip data sequence CD1 simultaneously to the sixteen correlators CR0 to CR15.

The correlators CR0 to CR15 all receive the same chip data sequence CD1, but correlate the chip data CD1 with different correlation coefficients to calculate and output the correlation values $s_0$ to $s_{15}$. As noted above, the correlation coefficients are not the chip values shown in FIG. 1, which would be used by conventional OQPSK demodulators, but data patterns obtained by OQPSK modulation of the 32-chip sequences onto I-phase and Q-phase carrier signals, as if the sequences were data to be transmitted, and FSK demodulation of the resulting modulated signals, yielding the data patterns shown in FIG. 8. Accordingly, correlator CR0, for example, uses the correlation coefficients shown in FIG. 9, rather than the chip data given for data symbol '0' in FIG. 1.

The correlation values output by the correlators CR0 to CR15 as the results of correlation with the corresponding correlation coefficients are sent to the maximum value selector 15, which outputs the maximum value signal MV corresponding to the correlator that produced the largest value among the correlation values $s_0$ to $s_{15}$.

The data converter 16 outputs binary data BD corresponding to the maximum value signal MV, whereby the despreading of the modulated signal MS1 is completed.

In the type of direct-sequence spread spectrum communication defined by the conditions (a) to (d) given above, this embodiment reduces the overall circuit size of the demodulator by using a frequency detector or FSK demodulator instead of a synchronous detector that requires carrier recovery.

Second Embodiment

A second embodiment will be described below, focusing on the differences from the first embodiment.

The demodulator in the second embodiment takes advantage of the paired relationship among the correlation coefficients shown in FIG. 8 to reduce the number of correlators.

Figure 10:
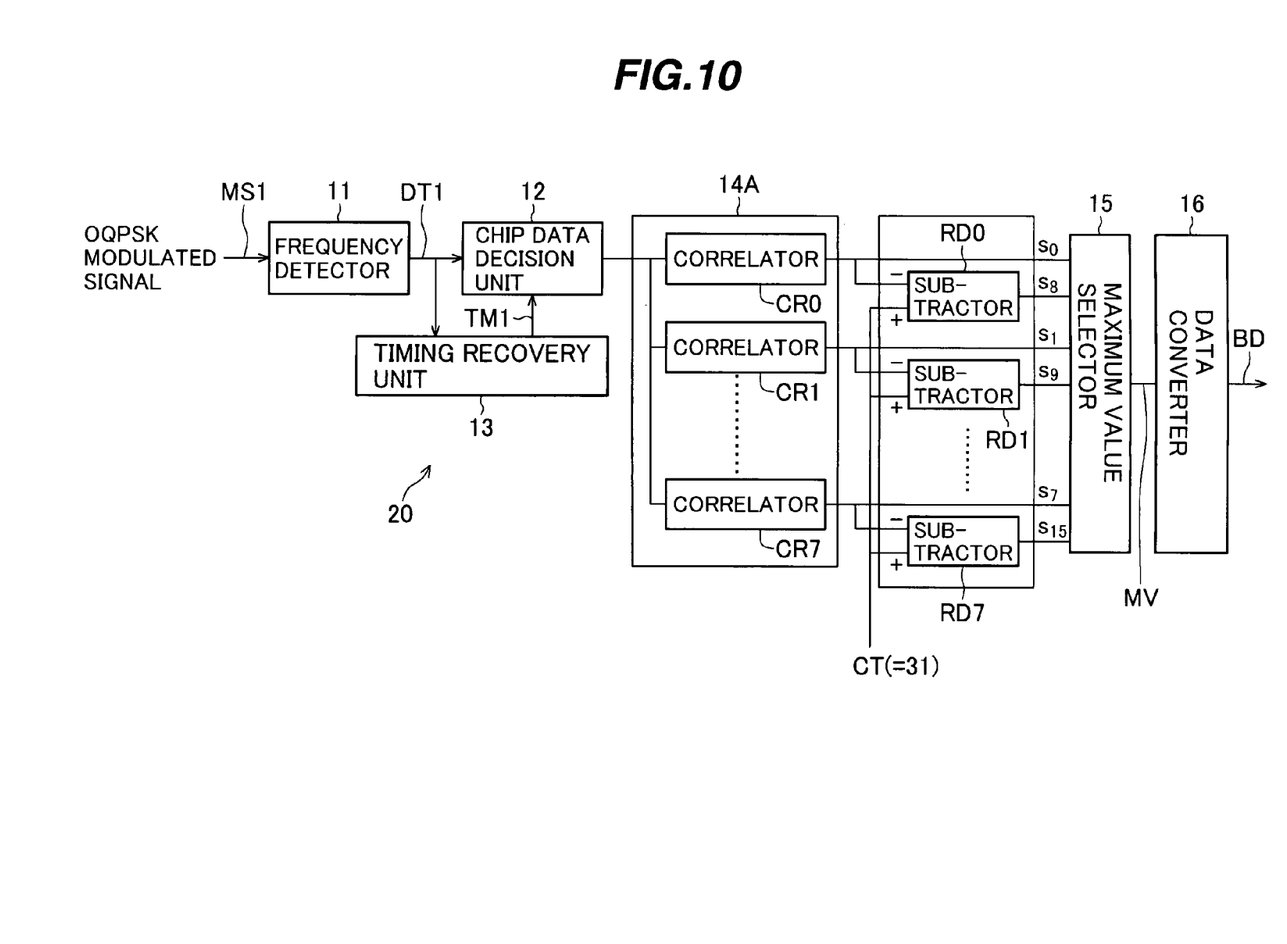
FIG. 10 is a block diagram of a demodulator illustrating a second embodiment of the invention.

Referring to FIG. 10, the second embodiment is a demodulator 20 comprising a frequency detector 11, a chip data decision unit 12, a timing recovery unit 13, a correlation unit 14A, a maximum value selector 15, a data converter 16, and a subtraction unit 21. The number of correlators included in the correlation unit 14A is half the number in the correlation unit in the first embodiment: whereas the correlation unit 14 in the first embodiment includes sixteen correlators CR0 to CR15, the correlation unit 14A in the second embodiment includes only eight correlators CR0 to CR7. The subtraction unit 21 includes eight subtractors RD0 to RD7.

The frequency detector 11, chip data decision unit 12, timing recovery unit 13, maximum value selector 15, data converter 16, and correlators CR0 to CR7 have the same functions as in the first embodiment, so descriptions will be omitted.

The correlation values $s_0$ to $s_7$ output from the correlators CR0 to CR7 in the correlation unit 14A are supplied directly to the maximum value selector 15 and also to the subtractors RD0 to RD7. Correlation value $s_0$ is supplied to the inverting input terminal (negative input terminal) of subtractor RD0; correlation value $s_1$ is supplied to the inverting input terminal of subtractor RD1; . . . ; correlation value $s_7$ is supplied to the inverting input terminal of subtractor RD7. A constant value CT equal to the maximum correlation value (31) noted in the first embodiment is supplied to the non-inverting input terminals (positive input terminals) of the subtractors RD0 to RD7.

Each of the eight subtractors RD0 to RD7 has the same function: the correlation value received at the inverting input terminal is subtracted from the constant value CT received at the non-inverting input terminal, and the subtraction result is sent to the maximum value selector 15.

The sixteen 31-chip sequences of correlation coefficients in FIG. 8 can be seen to form eight complementary pairs. For example, the correlation coefficients corresponding to data symbols '0' and '8' form a complementary pair, as follows:

11000000111011110101110011011100x
00111111000100001010001100100011x

The correlation values $s_0$ and $s_8$ in the first embodiment are therefore complementary. For example, when the correlation value $s_0$ produced by the correlator CR0 for data symbol '0' has the minimum value 0 (no chips match), the correlation value $s_8$ produced by the correlator CR8 for data symbol '8' has the maximum value 31 (all chips match). Accordingly, the difference obtained by subtractor RD0 is equal to correlation value $s_8$ in the first embodiment.

Similarly, the correlation coefficients corresponding to data symbols '1' and '9', '2' and '10', '3' and '11', . . . , and '7' and '15' form complementary pairs, the difference obtained by subtractor RD1 is equal to correlation value $s_9$, the difference obtained by subtractor RD2 is equal to correlation value $s_{10}$, and so on, the difference obtained by subtractor RD7 being equal to correlation value $s_{15}$. This makes it possible to obtain sixteen correlation values so to $s_{15}$ from only the eight correlators CR0 to CR7 and eight subtractors RD0 to RD7 provided in the demodulator 20.

Apart from the method of calculating correlation values $s_8$ to $s_{15}$, the second embodiment operates in substantially the same way as the first embodiment and produces substantially the same effects, while reducing the number of the correlators in the demodulator by half.

Although it depends on the specific circuit implementation, since a subtractor (such as RD0) has a simpler and smaller circuit configuration than a correlator (such as CR8), the second embodiment can substantially reduce the circuit scale of the demodulator.

Variations

The chip sequences in FIGS. 1 and 8 in the preceding embodiments are derived from a pseudo-random noise (PN) sequence, but the invention is not limited to the use of pseudo-random noise.

In the second embodiment, all data (chips) in the paired sequences of correlation coefficients are in a complementary relationship with one another, but any other predictable relationship can be used in a generally similar way. For example, if two sequences of correlation coefficients have identical I-phase values and complementary Q-phase values, the I-phase and Q-phase values can be correlated separately, and the sum and difference of the two results can be manipulated to obtain correlations with two different symbols.

The chip sequences in the first and second embodiments are shaped into sinewave pulse sequences, but the invention can be practiced without shaping the chips into sinewave pulses.

Although the first and second embodiments assume direct-sequence spread spectrum communication using OQPSK modulation, the invention can be practiced in any communication system in which the data symbols have fixed chip sequences. For example, the invention can be practiced with the complementary code keying (CCK) system specified in standard 802.11b of the Institute of Electrical and Electronics Engineers (IEEE) for use with wireless local area networks.

The invention can be practiced in either hardware or software, or a combination of hardware and software.

Those skilled in the art will recognize that further variations are possible within the scope of the invention, which is defined in the appended claims.

What is claimed is:

1. A demodulator receiving a spread spectrum signal in which different data symbols are represented by predetermined sequences of chips, the spread spectrum signal having been modulated by a phase modulation method, the demodulator comprising:
    a frequency detector using a frequency detection method to generate a frequency-detected signal representing successive chip values;
    a correlation unit for correlating the frequency-detected signal with predetermined sequences of correlation coefficients to generate a plurality of correlation values, the predetermined sequences of correlation coefficients being obtained by modulating the predetermined sequences of chips by said phase modulation method and demodulating the modulated predetermined sequences of chips by said frequency detection method; and
    a decision circuit for selecting one of the correlation values, thereby deciding which one of the data symbols the spread spectrum signal represents.

2. The demodulator of claim 1, wherein said phase modulation method is a phase-shift keying modulation method.

3. The demodulator of claim 2, wherein said phase modulation method is a quadrature phase-shift keying modulation method.

4. The demodulator of claim 3, wherein said phase modulation method is an offset quadrature phase-shift keying modulation method.

5. The demodulator of claim 1, wherein the frequency detection method is a frequency-shift keying detection method.

6. The demodulator of claim 1, wherein the decision circuit selects a maximum one of the correlation values.

7. The demodulator of claim 1, wherein the correlation unit comprises a number of correlators equal to the number of said different data symbols.

8. The demodulator of claim 1, wherein the different data symbols include a number of pairs of data symbols, the two sequences of chips representing each pair of data symbols having a fixed mutual relationship; the correlation unit includes a number of correlators equal to the number of said pairs of data symbols, and generates correlation values for one data symbol in each of the pairs of data symbols; and the decision circuit performs an operation on the correlation values generated by the correlation unit to generate correlation values for another data symbol in each of the pairs of data symbols.

9. The demodulator of claim 8, wherein the decision circuit performs said operation by subtracting the correlation values generated by the correlation unit from a predetermined constant value.

10. The demodulator of claim 9, wherein each of said predetermined sequences of chips includes a first subsequence and a second subsequence, the two data symbols in each of said pairs of data symbols having identical first subsequences and complementary second subsequences.

11. The demodulator of claim 10, wherein the first subsequence is used to modulate an in-phase carrier signal and the second subsequence is used to modulate a quadrature carrier signal.

12. The demodulator of claim 1, further comprising a chip data decision unit for determining the chip values in the frequency-detected signal and supplying the chip values to the correlation unit.

13. The demodulator of claim 12, further comprising a timing recovery unit for determining an optimal decision timing from the frequency-detected signal and providing the optimal decision timing to the chip data decision unit.

14. A method of demodulating a received spread spectrum signal in which different data symbols are represented by predetermined sequences of chips, the spread spectrum signal having been modulated by a phase modulation method, the method comprising:
    using a frequency detection method to generate a frequency-detected signal representing successive chip values;
    correlating the frequency-detected signal with predetermined sequences of correlation coefficients to generate a plurality of correlation values; and
    selecting one of the correlation values, thereby deciding which one of the data symbols the spread spectrum signal represents.

15. The method of claim 14, further comprising:
    modulating the predetermined sequences of chips by said phase modulation method; and
    demodulating the modulated predetermined sequences of chips by said frequency detection method to obtain the predetermined sequences of correlation coefficients.

16. The method of claim 14, wherein said phase modulation method is a phase-shift keying modulation method.

17. The method of claim 16, wherein said modulation method is a quadrature phase-shift keying modulation method.

18. The method of claim 17, wherein said modulation method is an offset quadrature phase-shift keying modulation method.

19. The method of claim 14, wherein the frequency detection method is a frequency-shift keying detection method.

20. The method of claim 14, wherein selecting one of the correlation values comprises selecting a maximum one of the correlation values.

21. The method of claim 14, wherein the different data symbols include a number of pairs of data symbols, the two sequences of chips representing each pair of data symbols having a fixed mutual relationship, and correlating the frequency-detected signal with predetermined sequences of correlation coefficients to generate a plurality of correlation values further comprises:

correlating the frequency-detected signal with a number of the correlation unit with a number of sequences of correlation coefficients said pairs of data symbols equal to the number of pairs of data symbols to generate correlation values for one data symbol in each of the pairs of data symbols; and performing an operation on the correlation values generated for said one data symbol in each of the pairs of data symbols to generate correlation values for another data symbol in each of the pairs of data symbols.

22. The method of claim 21, wherein said operation comprises subtracting the correlation values generated for said one data symbol in each of the pairs of data symbols from a predetermined constant value.

23. The method of claim 22, wherein each of said predetermined sequences of chips includes a first subsequence and a second subsequence, the two data symbols in each of said pairs of data symbols having identical first subsequences and complementary second subsequences.

24. The method of claim 23, wherein the first subsequence is used to modulate an in-phase carrier signal and the second subsequence is used to modulate a quadrature carrier signal.

25. The method of claim 14, further comprising:

determining an optimal decision timing from the frequency-detected signal; and determining the chip values in the frequency-detected signal at the optimal decision timing.

* * * * *